(12) United States Patent
Frankenberg et al.

(10) Patent No.: US 11,343,058 B2
(45) Date of Patent: May 24, 2022

(54) CELL SEARCH PROCEDURE USING PRIMARY SYNCHRONIZATION SIGNALS (PSS) AND SECONDARY SYNCHRONIZATION SIGNALS (SSS) IN A WIRELESS COMMUNICATION SYSTEM

(71) Applicant: Siemens Aktiengesellschaft, Munich (DE)

(72) Inventors: Robert Frankenberg, Vienna (AT); Jaroslaw Kussyk, Vienna (AT); Martin Brunner, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 256 days.

(21) Appl. No.: 16/182,157

(22) Filed: Nov. 6, 2018

(65) Prior Publication Data
US 2019/0140809 A1    May 9, 2019

(30) Foreign Application Priority Data
Nov. 7, 2017  (EP) .................................... 17200280

(51) Int. Cl.
*H04L 5/14* (2006.01)
*H04L 5/00* (2006.01)

(52) U.S. Cl.
CPC .............. *H04L 5/14* (2013.01); *H04L 5/0048* (2013.01); *H04L 5/1415* (2013.01)

(58) Field of Classification Search
CPC ........ H04L 5/14; H04L 5/0048; H04L 5/1415
See application file for complete search history.

(56) References Cited

U.S. PATENT DOCUMENTS

| 5,103,446 A | 4/1992 | Fischer |
| 7,313,163 B2 | 12/2007 | Liu et al. |

(Continued)

FOREIGN PATENT DOCUMENTS

EP    1059773    12/2000

OTHER PUBLICATIONS

EP Search Report based on EP No. 17200280 dated May 4, 2018.

*Primary Examiner* — Ian N Moore
*Assistant Examiner* — Rushil Parimal Sampat
(74) *Attorney, Agent, or Firm* — Cozen O'Connor

(57) ABSTRACT

A method for establishing a duplex connection for data transmission between transmission units in a communications system, wherein the transmission units each have a transmit unit and a receive unit, where the duplex connection includes oppositely directed, unidirectional transmission channels, by which a communications link for each data transmission between respective transmit and receive units of the transmission units is established, during a synchronization phase transmit units independently emit in a periodically repeated manner a first synchronization signal respectively, where following detection and synchronization with the respective first synchronization signal by the respective receive unit, the respective transmit unit belonging to the same transmission unit is instructed to emit at least once a second synchronization signal respectively, where a changeover to data transmission is implemented once the second synchronization signal respectively has been detected at least once by respective receive units of the transmission units.

9 Claims, 6 Drawing Sheets

(56) References Cited

U.S. PATENT DOCUMENTS

| | | | | |
|---|---|---|---|---|
| RE44,284 E | * | 6/2013 | Lee | H04B 1/7077 |
| | | | | 370/350 |
| 10,887,855 B2 | * | 1/2021 | Liu | H04W 72/04 |
| 2016/0380488 A1 | * | 12/2016 | Widmer | H04B 5/0037 |
| | | | | 324/207.15 |
| 2017/0048810 A1 | * | 2/2017 | Sahlin | H04W 56/0045 |
| 2018/0205589 A1 | * | 7/2018 | Bai | H04L 27/2613 |

* cited by examiner

CELL SEARCH PROCEDURE USING PRIMARY SYNCHRONIZATION SIGNALS (PSS) AND SECONDARY SYNCHRONIZATION SIGNALS (SSS) IN A WIRELESS COMMUNICATION SYSTEM

BACKGROUND OF THE INVENTION

1. Field of the Invention

The present invention relates to a method for establishing a duplex connection for data transmission between two transmission units in a communications system, where the two transmission units have a transmit unit and a receive unit in each case, and where the duplex connection comprises at least two opposingly directed, unidirectional transmission channels, by which a communications link for data transmission between the respective transmit unit and the respective receive unit of the two transmission units is established in each case.

2. Description of the Related Art

Infrastructure for transmitting information is conventionally referred to as a communications system in telecommunications and communications engineering. For exchanging or for transmitting the information and/or data, such as in the form of a bit stream, a communications link can be established in the communications system via a transmission medium (such as the cable, radio, or power line), via which information or data is exchanged between at least two transmission units. One transmission unit can function, for example, as a transmitter and a further transmission unit as a receiver, with the data being transmitted from the transmitter to the receiver. A transmission unit can, however, also have a transmit unit or a transmitter and a receive unit or receiver to be able to send as well as receive data.

What are known as duplex connections are currently used for exchanging information (such as speech or data) in many communications networks or communications systems, in particular in telephone, data and radio networks. Duplex connections can also be used, however, with what is known as carrier frequency message transmission via high and/or medium voltage lines or power line carrier communication (PLCC). Here, for example, existing electrical lines, in particular overhead lines, of high and/or medium voltage networks are used as the transmission medium for an exchange of information or data between transmission units. For example, carrier frequency systems in a frequency range between 30 kHz and 500 kHz, or in some regions also up to several MHz, are used for the exchange of information or data.

In communications engineering the term "duplex" designates a communications method in which two transmission units having a transmit unit or a transmitter and a receive unit or a receiver can exchange information and/or data in both directions. These transmission units are connected by a transmission medium, such as a cable, power line, or radio, where at least one transmission channel is used as the transmission path from the transmitter to the receiver for the communications link.

With duplex connections a distinction is made between what are known as half-duplex connections and what are known as full-duplex connections. With a half-duplex connection, information/data can be exchanged alternately, but not at the same time between the transmission units. With a full-duplex connection, information/data is transmitted between the transmission units in both directions at the same time. For this purpose, the full-duplex connection can, for example, comprise two opposingly directed, unidirectional transmission channels. This means that, for example, a first unidirectional transmission channel is used for the exchange of data between the transmitter of a first transmission unit and the receiver of a second transmission unit, and that a second unidirectional transmission channel is used for the exchange of data between the transmitter of the second transmission unit and the receiver of the first transmission unit. Different duplexing methods or duplex methods can be used for generating the two opposingly directed, unidirectional transmission channels when using the same physical transmission medium (for example, a radio interface, a cable, or power line).

What is known as time duplex or time-division duplex (TDD) methods constitute one possibility. With the TDD method the two unidirectional transmission channels use the same frequencies but these are separated from each other time-wise. This means that only one frequency band is used with the TDD method, with the two transmission units alternating during use. A further duplex method is what is known as the frequency duplex or Frequency Division Duplex (FDD) method. Here, the information/data is transmitted between the two transmission units via carrier frequencies that are different for each direction. In other words, a separate frequency band is used for each transmission direction. A further duplex method is, for example, what is known as the code duplex or Code Division Duplex (CDD) method in which the information for each direction is encoded by different spreading codes and is therefore transmitted at the same time and at the same frequencies. Furthermore, the duplex methods can also be combined. Thus, a combination of TDD and FDD methods is used, for example, in the mobile phone sector.

In order to establish a communications link, it is also important for the receiver to identify a grid in which the information/data emitted by the transmit unit of the respective transmission units arrive. This means that a clock frequency, with which the data or information units are emitted by the transmit unit of the other transmission unit in each case, has to be identified by the receive unit of the respective transmission unit. This recognition and matching with the clock frequency of the respective transmitter via the respective receive unit is also referred to as synchronization. If the same clock frequency is used by transmit and receive units, then the transmitter and receiver process the information units or signals to be transmitted or received synchronously or quasi-synchronously (in other words, with an admissible deviation in the synchronicity). As a rule, a period of the information units or signals to be transmitted is known. Consequently, the synchronization of the respective receive unit can be limited, for example, to a starting instant or with multi-carrier signal transmission, identify a starting phase, such as of information or data transmission.

Specific signals, such as a sequence of pilot tones, and/or known information units or what are known as chirp signals, are used in communications engineering before data transmission for synchronization of individual unidirectional connections between transmit and receive units. These specific signals are emitted as a preamble, whose form or sequence is known to the receive unit, before transmission of information, etc. by the transmit unit and are used for the synchronization between transmit and receive unit.

With a duplex connection between two transmission units, which comprises two unidirectional transmission channels or communications links, it is however necessary for both opposingly directed communications links to perform a synchronization of the respective receive unit with the respective transmit unit. Furthermore, it is important that the two unidirectional communications links are established so as to be compatible, in particular because the opposingly directed, unidirectional transmission channels or connections of the duplex connection between the transmission units can alternately include a feedback channel to enable, for example, an adjustment to the respective transmission channel.

A duplex connection between two transmission units can therefore be established, for example, in accordance with what is known as the Master-Slave principle. Here, for example, one transmission unit is configured as the master and the other transmission unit as the slave. The establishment of the duplex connection is then controlled, for example, by the transmission unit configured as the master. This procedure has the drawback, however, that increased effort is necessary, in particular during commissioning, primarily in order to configure the transmission units accordingly. Furthermore, due to the unilaterally controlled establishment of the connection (in other words, the establishment of the connection is initiated and controlled by the master transmission unit), it can take longer until the duplex connection is established. Furthermore, during synchronization no status information can be transmitted with respect to the respective transmission unit and/or a status of establishment of the connection. Information of this kind can be transmitted via specific datagrams, for example, only after synchronization or during the regular data transmission phase.

SUMMARY OF THE INVENTION

It is therefore an object of the invention to provide a method for establishing a duplex connection having at least two opposingly directed, unidirectional transmission channels between two transmission units in a communications system, with which method synchronization of the receive units of the transmission units and coordinated establishment of the two communications links or transmission channels is quickly enabled without additional effort, and with which information for synchronization can be transmitted to the respective transmission unit before synchronization of the respective receive unit.

This and other objects and advantages are achieved in accordance with the invention for establishing a duplex connection for data transmission between two transmission units. For this purpose, each of the two transmission units has a transmit unit or a transmitter and a receive unit or a receiver. The duplex connection comprises two opposingly directed, unidirectional transmission channels, by which a communications link for data transmission between the respective transmit unit and the respective receive unit of the two transmission units is established in each case. During a synchronization phase, the transmit units of the two transmission units independently emit, in a periodically repeated manner, a first synchronization signal respectively. Following detection and synchronization with the respective first synchronization signal by the respective receive unit, the transmit unit belonging to the same transmission unit respectively is instructed to emit at least one time a second synchronization signal respectively instead of the respective first synchronization signal. Once the second synchronization signal respectively has been detected at least one time by the receive units of the two transmission units, a change-over to transmission of information units is then implemented.

The main aspect of the method in accordance with the invention consists in that more robust and, in particular, faster establishment of a duplex connection having two opposingly directed, unidirectional transmission channels between two transmission units is thereby possible. This is achieved in particular by a transmission of information via the two transmission units or a respective status of the synchronization. This status information about a respective synchronization status in the respective transmission unit is transmitted during the synchronization phase (in other words, even before a regular data transmission) by the emission of two different synchronization signals per transmit unit or by a change from a first to a second synchronization signal of the other transmission unit, respectively.

The two transmission units are equal for the establishment of the duplex connection via the inventive method, so configuration effort can be kept low. Furthermore, the inventive method enables simultaneous establishment of the communications links of the duplex connection or a simultaneous synchronization of the respective communications link. The duplex connection between the two transmission units can be established relatively quickly and in a coordinated manner thereby.

It is advantageous if the second synchronization signal respectively is derived from the first synchronization signal respectively of the transmit unit of the respective transmission unit. The second synchronization signal can be derived from the first synchronization signal, for example, by modulation of the repetition period of the first synchronization signal. For this purpose, a repetition period of the second synchronization signal can be lengthened with respect to the repetition period of the first synchronization signal, such as by inserting breaks. Alternatively, the second synchronization signal can also be generated by the transmitter by changing an amplitude and/or a polarity of the first synchronization signal. The first synchronization signal is ideally generated in accordance with a method for synchronization of transmit and receive units with multi-carrier signal transmission, which method is known from as yet unpublished European patent application EP 17200243.8.

A control unit is ideally provided in each of the two transmission units, by which control unit data transmission is monitored and the synchronization phase initiated. The synchronization phase can be very easily induced by the control units, for example, following start-up of at least one of the two transmission units, or, in the case of communication disturbance, during data transmission.

Furthermore, the control unit of the respective transmission unit can advantageously be used to inform the transmit unit of the respective transmission unit about the detection and synchronization of the receive unit belonging to the same transmission unit, and a change from the first to the second synchronization signal is induced. It is advantageous here if detection and synchronization is signaled with the first synchronization signal respectively by the respective receive unit of the control unit belonging to the same transmission unit. The transmit unit belonging to the same transmission unit can then be instructed by this control unit to emit the second synchronization signal respectively.

In an expedient embodiment of the inventive method, the synchronization phase is initiated after starting of the two transmission units and/or due to a reception or communication disturbance during data transmission. Reception or communication disturbances can advantageously be determined by the respective receiver via a metric for reception quality. For example, what is known as the Cyclic Redundancy Check (CRC) or an increased bit error rate and/or block error rate or an increased bit error ratio and/or block error ratio can be used as metrics of this kind. With the cyclic redundancy check, a test value for data is determined in order to be able to identify errors during transmission. The bit error rate or bit error frequency (number of bit errors per unit of time) or the bit error ratio (number of bit errors in relation to the number of received bits) can be estimated in communications engineering conventionally for the quality of a transmission via a transmission channel. A disturbance in the communications link via the respective transmission channel can be inferred with an increased bit error rate or an increased bit error ratio. A block error conventionally exists if one or more bit(s) in a block are incorrect. The block error rate, as well as the block error ratio, is similarly a measure of the quality of the data transmission and can therefore also be used to identify reception or communications disturbances.

In a preferred embodiment of the inventive method, in addition to the two opposingly directed, unidirectional transmission channels, two further unidirectional transmission channels are provided between the two transmission units. These two additional unidirectional transmission channels can be used by the transmit units of the two transmission units, such as additional signaling and/or data transfer tasks. The additional two unidirectional transmission channels differ in frequency range from the two opposingly directed, unidirectional transmission channels but are similarly opposingly directed.

It is advantageous in this connection if at least one status signal of the respective transmission unit is transmitted via the two additional transmission channels, such as after start-up of the two transmission units. The transmit units of the two transmission units are instructed, for example, by the respective control unit, to periodically repeatedly emit the first synchronization signal respectively only after detection of the respective status signal of the other transmission unit, respectively. An operating state can thereby be signaled very easily to the respective other transmission unit. The respective transmission unit or the associated transmitter begins emitting the first synchronization signal respectively only after reception of the status signal from the other transmission unit. The first synchronization signal is therefore not received in the respective receive units of the two transmission units before detection of the status signal or the respective receive units know that no synchronization signal is being emitted. For example, incorrect interpretation of a noise or an interference signal as the synchronization signal is reduced thereby.

It is advantageous if the duplex connection is configured as a full-duplex connection. The duplex connection can ideally be implemented via a time division duplex method, a frequency division duplex method, a code division duplex method or a combination of at least two of these duplex methods.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be illustrated by way of example below with reference to the accompanying figures, in which.

DETAILED DESCRIPTION OF THE EXEMPLARY EMBODIMENTS

Figure 1:
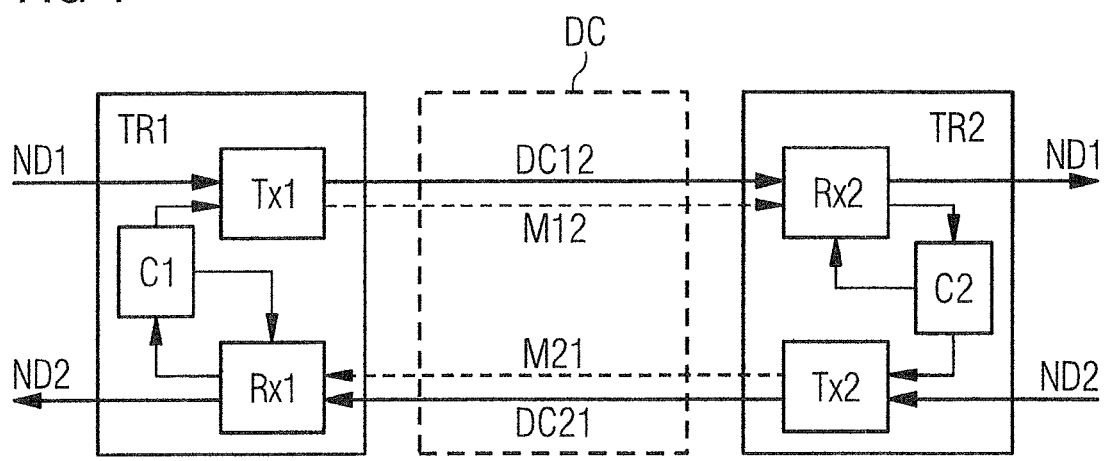
FIG. 1 shows a schematic and exemplary construction of a communications system for implementing the method for establishing a duplex connection with two transmission units in accordance with the invention.

FIG. 1 shows schematically and by way of example a communications system for implementing the inventive method for establishing a duplex connection for data transmission between two transmission units TR1, TR2. The transmission units TR1, TR2 are connected together by a transmission medium, such as a high voltage line, a medium voltage line, a cable, or a radio link. The transmission medium is used for a duplex connection DC. The duplex connection can be configured, for example, as a full-duplex connection or be implemented based on Time Division Duplexing (TDD), Frequency Division Duplexing (FFD), Code Division Duplexing (CDD) or a combination of these methods (such as TDD and FDD).

The duplex connection has two unidirectional transmission channels DC12 and DC21 that are opposingly directed. This means a first communications link is established for a signal and data transmission from a first transmission unit TR1 to a second transmission unit TR2 via a first transmission channel DC12 and a second communications link is established for a signal and data transmission from the second transmission unit TR2 to the first transmission unit TR1 via a second transmission channel DC21. Two further, unidirectional transmission channels M12, M21 can optionally be provided that differ in frequency range from the transmission channels DC12, DC21. The optional transmission channels M12, M21 can be used, for example, for additional signaling and data transfer tasks (for example, transfer of status signals, etc.).

Each of the two transmission units TR1, TR2 has a transmit unit Tx1, Tx2 and a receive unit Rx1, Rx2. During data transmission (in other words after a synchronization phase) useful data ND1, ND2 for transmission is prepared, coded and then transmitted in a modulated manner in the respective transmit units Tx1, Tx2, via the respective transmission channels DC12, DC21, to the respective receive unit Rx1, Rx2. Received data is demodulated and decoded in the respective receive unit Rx1, Rx2 and output as the respective received data ND1, ND2 by the respective receiver. With the communications system illustrated in FIG. 1, useful data ND1 is transmitted by the transmit unit Tx1 of the first transmission unit TR1 via the first transmission channel DC12 to the receive unit Rx2 of the second transmission unit TR2 and useful data ND2 is transmitted from the transmit unit Tx2 of the second transmission unit TR2 via the second transmission channel DC12 to the receive unit Rx1 of the first transmission unit TR1.

If further, two transmission channels M12, M21 are provided, the transmit units Tx1, Tx2 can optionally also emit (for example, modulated) signals via these further, two unidirectional transmission channels M12, M21.

Furthermore, each of the two transmission units TR1, TR2 can comprise a control unit C1, C2. For example, correct data transmission via the duplex connection DC can be monitored by the control units C1, C2. Furthermore, the synchronization phase can be initiated by the respective control unit C1, C2 (for example, on starting or after start-up of the transmission units TR1, TR2 or after a communication disturbance and/or interruption in data transmission).

Figure 2:
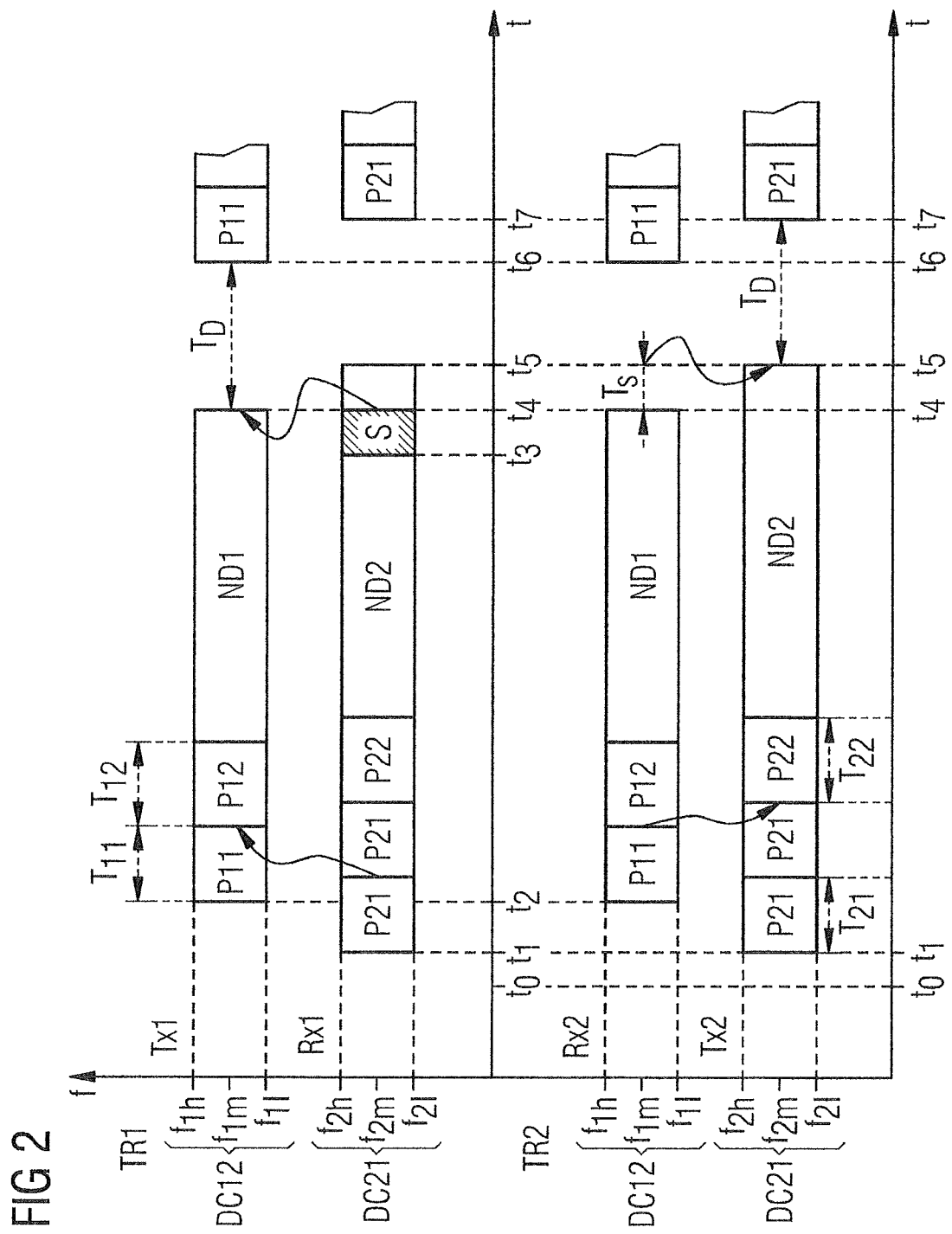
FIG. 2 shows an exemplary graphical plot of the time characteristic of the inventive method for establishing a duplex connection between two transmission units.

FIG. 2 shows an exemplary graphical plot of a time characteristic of the inventive method for establishing a duplex connection DC, with the signals emitted by the transmit units Tx1, Tx2 or received by the receive units Rx1, Rx2 being shown in a time-frequency diagram. The time t is plotted on a horizontal axis. The frequency f is plotted on a vertical axis, with the first transmission unit TR1 having the first transmitter Tx1 and the first receiver Rx1 and the signals at the output of the first transmit unit Tx1 and the signals at the input of the first receive unit Rx1 being plotted on the frequency axis f in an upper part. The second transmission unit TR2 with the second receiver Rx2 and the second transmitter Tx2 and the signals at the input of the second receive unit Rx2 and the signals at the output of the second transmit unit Tx2 are shown in the lower part.

The first transmitter uses the first transmission channel DC12 for emitting signals, where the channel is limited by an upper limit frequency $f_{1h}$ and by a lower limit frequency $f_{1l}$ and has a medium frequency $f_{1m}$. The transmit unit Tx1 transmits signals and data to the second receive unit Rx2 via the first transmission channel DC12. The first transmission channel DC12 with the lower limit frequency $f_{1l}$, the upper limit frequency $f_{1h}$ and the medium frequency $f_{1m}$ are therefore re-plotted on the frequency axis f in the lower part.

The second transmission channel DC21 is used by the second transmit unit Tx2 for signal and data transmission to the first receive unit Rx1. The second transmission channel DC21 is therefore shown on the frequency axis in the lower part of FIG. 2, with an upper limit frequency $f_{2h}$ and a limit frequency $f_{2l}$ as well as a medium frequency $f_{m2}$ of the second transmission channel DC21 being shown on the frequency axis f. Signals and data are transmitted to the first receive unit Rx1 via the second transmission channel DC21. The upper limit frequency fen, the lower limit frequency $f_{2h}$, as well as the medium frequency $f_{m2}$ of the second transmission channel DC21 are therefore re-plotted on the frequency axis f in the lower region of the upper part and the graph of the first transmission unit TR1 in FIG. 2.

After the two transmission units TR1, TR2 have been switched on at instant to, for example, the transmit unit Tx2 of the second transmission unit TR2 begins emitting a first synchronization signal P21 at an instant $t_1$, where the signal P21 has a repetition period $T_{21}$. At an instant $t_2$, the transmit unit Tx1 of the first transmission unit TR1 (independently of the transmit unit Tx2 of the second transmission unit TR2) also begins emitting a first synchronization signal P11 with a repetition period $T_{11}$.

If the receive unit Rx1 of the first transmission unit TR1 successfully detects the first synchronization signal P21 of the transmitter Tx2 of the second transmission unit TR2 and the receive unit Rx1 of the first transmission unit TR1 is synchronized with the first synchronization signal P21 of the transmit unit Tx2 of the second transmission unit TR2, then this fact is signaled to the control element C1 of the first transmission unit TR1 by the receiver Rx1 of the first transmission unit TR1. The transmit unit Tx1 of the first transmission unit TR1, which in the meantime periodically repeatedly emits its first synchronization signal P11 to the receive unit Rx2 of the second transmission unit TR2, is instructed by the control unit C1 to emit a second synchronization signal P12 at least one time following a first synchronization signal P11 that is optionally still to be completely emitted in order to thereby inform the control unit C2 of the second transmission unit TR2 via the receive unit Rx2 of the second transmission unit TR2 about the synchronization status of the receive unit Rx1 of the first transmission unit TR1.

The second synchronization signal P12 of the first transmission unit is derived, for example, via modulation of the repetition period T11 of the first synchronization signal P11 from the first synchronization signal P11, such as by inserting breaks. The second synchronization signal P12 then has, for example, a repetition period $T_{12}$ that is longer than the repetition period $T_{11}$ of the first synchronization signal P11. Alternatively, the second synchronization signal P12 of the transmit unit Tx1 of the first transmission unit TR1 can be derived, for example, via modulation of polarity and/or amplitude from the first synchronization signal P11.

In the case of the transmit unit Tx2 of the second transmission unit TR2, there is still no information about the synchronization status or completed synchronization of the receive unit Rx2 of the second transmission unit TR2 after one-time emission of the first synchronization signal P21. As a result, the transmitter Tx2 of the second transmission unit TR2 starts with repeated emission of the first synchronization signal P21. If there was successful detection and synchronization of the receive unit Rx2 of the second transmission unit TR2 with the first synchronization signal P11 of the transmitter Tx1 of the first transmission unit TR1, then this is signaled to the control unit C2 of the second transmission unit TR2 by the receive unit Rx2 of the second transmission unit TR2. The transmit unit Tx2 of the second transmission unit TR2 is then instructed by the associated control unit C2 to transmit a second synchronization signal P22 as the next signal.

The second synchronization signal P22 of the transmit unit Tx2 of the second transmission unit TR2 can similarly be derived from the first synchronization signal P21 of the transmit unit Tx2 of the second transmission unit TR2, for example, via modulation of the repetition period $T_{12}$. It then has, for example, a longer repetition period $T_{22}$. Alternatively, the second synchronization signal P22 of the transmit unit Tx2 of the second transmission unit TR2 can similarly be derived, for example, via modulation of polarity and/or amplitude, from the first synchronization signal P12.

With the alternating, at least one-time transmission of the second synchronization signal P12, P22 respectively by the transmit units Tx1, Tx2 after previous emission of the first synchronization signal P11, P21 respectively, the two transmission units TR1, TR2 are informed about the successful detection and synchronization of the first synchronization signal P11, P21 respectively by the respective receive units Rx1, Rx2. After successful detection of the second synchronization signal P12, P22 respectively in the respective receive units Rx1, Rx2, a changeover from the synchronization phase to data transmission is then performed. For this purpose, for example, the respective receive units Rx1, Rx2 are instructed by the respective control units C1, C2 to changeover to synchronize reception of the useful data ND1, ND2. At the same time, the respective transmit units Tx1, Tx2 of the two transmission units TR1, TR2 are instructed by the respective control units C1, C2 to begin emitting the useful data ND1, ND2. For example, firstly optional starting sequences and then useful data blocks can be transmitted.

FIG. 2 also shows by way of example a reception or communication disturbance S in one of the transmission channels DC12, DC21, for example, in the second transmission channel DC2. The reception disturbance S is detected by the receiver Rx1 of the first transmission unit TR1 at an instant $t_3$. The reception disturbance can be determined, for example, via a metric for received signal quality, such as by cyclical redundancy checking or by using an increased bit and/or block error rate or an increased bit error ratio and/or block error ratio (in the receive unit Rx1 of the first transmission unit TR1).

After a sufficiently long disturbance duration, the reception or communication disturbance is interpreted in the receive unit Rx1 of the first transmission unit TR1 by the control unit C1 of the first transmission unit TR1 as a synchronization loss. Transmission of the useful data by the transmit unit Tx1 of the first transmission unit TR1 is then stopped by the control unit C1 at an instant $t_4$. After a predefinable break in transmission $T_D$, the synchronization phase is then started at an instant $t_6$, such as by instruction of the control unit C1. For this purpose, the transmit unit Tx1 of the first transmission unit TR1 begins to emit the first synchronization signal P11 again at instant $t_6$.

The interruption in the useful data transmission is detected and signaled to the associated control unit C2 in the second transmission unit TR2 after a duration $T_S$ in the associated receive unit Rx2. The transmit unit Tx2 of the second transmission unit TR2 is then instructed by the control unit C2 to likewise stop useful data transmission. After a break $T_D$, the synchronization phase is also re-started in the second transmission unit TR2 at an instant $t_7$. At instant $t_7$, the transmit unit Tx2 of the second transmission unit TR2 begins periodically repeated emission of the first synchronization signal P21. The two communications links or two unidirectional transmission channels DC12, DC21 were put into a renewed synchronization phase again thereby.

Figure 3:
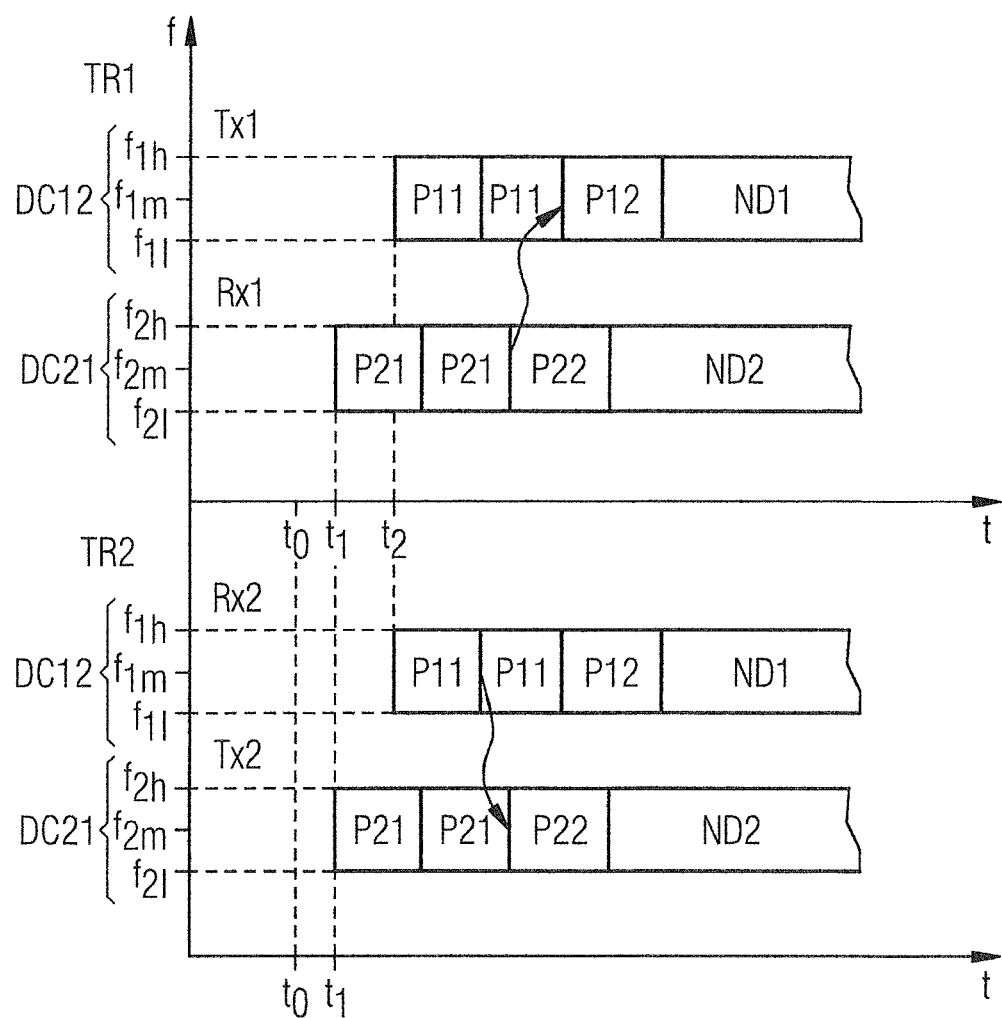
FIG. 3 shows a further, exemplary time characteristic of the inventive method for establishing a duplex connection between two transmission units.

FIG. 3 shows a further, exemplary time characteristic of the inventive method for establishing a duplex connection DC between two transmission units TR1, TR2. As in FIG. 2, the signals emitted by the transmit units Tx1, Tx2 and the signals received by the receive units Rx1, Rx2 are again shown in a time-frequency graph. In the upper part of the frequency-time graph are again the first transmission unit TR1 or the signals at the output of the transmit unit Tx1 of the first transmission unit TR1, which are transmitted via first transmission channel DC12 to the second transmission unit TR2, and the signals at the input of the receive unit Rx1 of the first transmission unit TR1, which are received from the second transmission unit TR2 via the second transmission channel DC21. In the lower part of the frequency-time graph are again the second transmission unit TR2 and the signals at the input of the receive unit Rx2 of the second transmission unit TR2, which are received via the first transmission channel DC12, and the signals at the output of the transmit unit Tx2 of the second transmission unit TR2, which are transmitted to the first transmission unit TR1 via the second transmission channel DC21.

The two transmission units TR1, TR2 are again switched on at an instant $t_0$. At the respective instants $t_1$, $t_2$ the transmit units Tx1, Tx2 begin, again independently of each other, emitting the first synchronization signal P11, P21 respectively. In contrast to the course, shown by way of example in FIG. 2, of the inventive method, for example the first synchronization signal P21 by the transmit unit Tx2 of the second transmission unit TR2 is not detected in the receiver Rx1 of the first transmission unit TR1, for example, owing to a brief disturbance. Therefore, the first synchronization signal P21 is emitted again by the transmitter Tx2 of the second transmission unit TR2. If this first synchronization signal P21 is now detected by the receive unit Rx1 of the first transmission unit TR1 and the receive unit Rx1 of the first transmission unit TR1 can synchronize with the repeatedly transmitted first synchronization signal P21 of the transmitter Tx2, then this is signaled to the control unit C1 of the first transmission unit TR1.

The transmit unit Tx1 of the first transmission unit TR1, which began emitting its first synchronization signal P11 for the synchronization of the receiver Rx2 of the second transmission unit TR2 as early as at instant $t_2$, is then instructed by the control unit C1 to begin emitting the second synchronization signal P12 after the first synchronization signal P11 that has just been emitted. The second transmission unit TR2 is thereby informed by way of its receive unit Rx2 about the successful synchronization of the receive unit Rx1 of the first transmission unit TR1. At the same time, (as already described in the case of FIG. 2) the repeatedly emitted first synchronization signal P11 was detected by the receive unit Rx2 of the second transmission unit TR2 and synchronization achieved or signaled to the control unit C2 of the second transmission unit TR2. The transmit unit Tx2 of the second transmission unit TR2 was also instructed by the control unit C2 to emit the second synchronization signal P22.

Once the second synchronization signal P12, P22 respectively has been emitted again by the two transmit units Tx1, Tx2 of the two transmission units TR1, TR2 and has been detected by the respective receive units Rx1, Rx2, there is again a changeover, initiated by the respective control unit C1, C2, to transmission of the respective useful data ND1, ND2, where, in the example shown in FIG. 3, transmission of the useful data ND1 via the first transmission channel DC12 is delayed by the transmit unit Tx1 of the first transmission unit TR1 by at least one repetition period $T_{11}$ of the respective first synchronization signal P11.

In the event of a reception or communication disturbance in one of the two transmission channels DC12, DC21, the synchronization phase can be started anew (as described in FIG. 2) even with the course of the process shown by way of example in FIG. 3.

Figure 4:
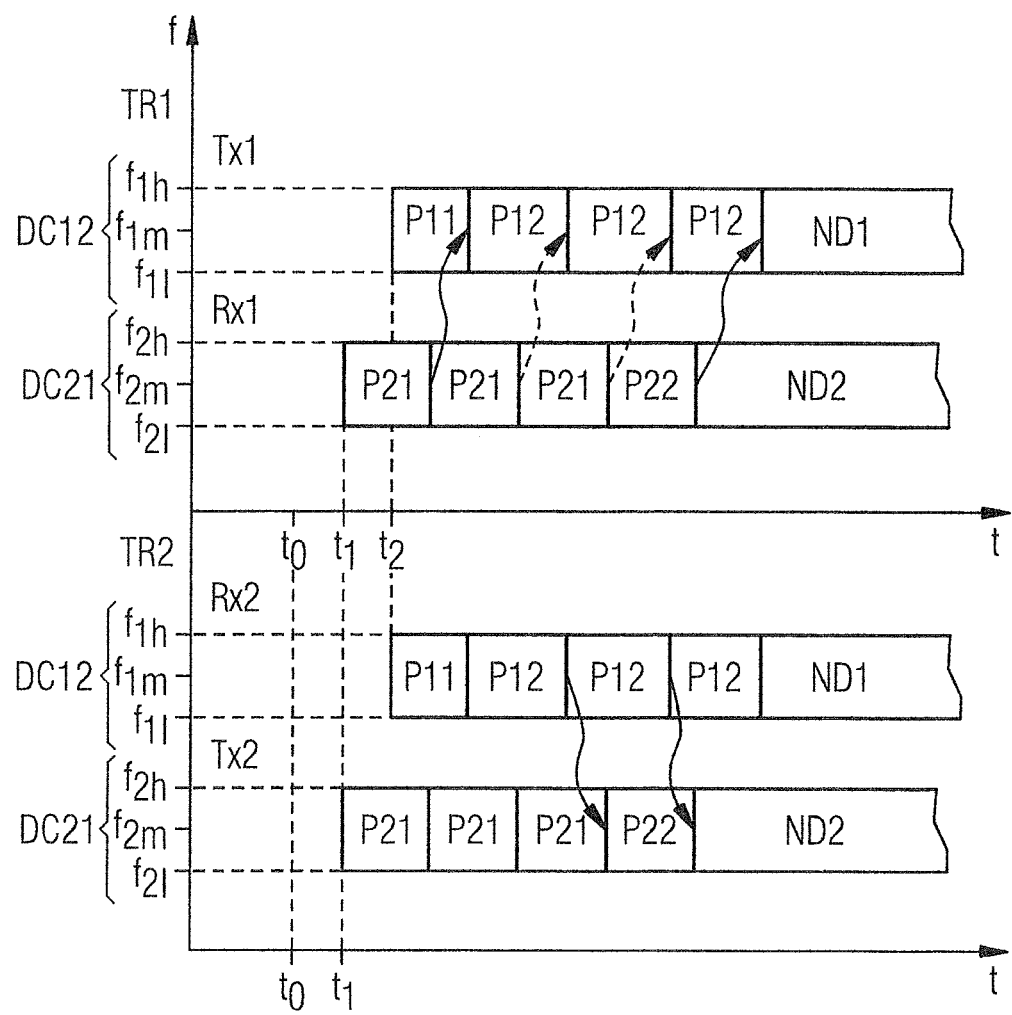
FIG. 4 shows a further, exemplary graphical plot of the inventive method for establishing a duplex connection between two transmission units using two synchronization signals respectively for the establishment.

FIG. 4 describes, by way of example, a further course of the inventive method, where in FIG. 4, such as in addition to the first synchronization signal P11, P21 respectively, the second synchronization signal P12, P22 respectively is also used for establishing the duplex connection DC or for synchronization of the respective receive units Rx1, Rx2.

FIG. 4 again shows the exemplary course of the method in the form of a frequency-time graph with the signal characteristic at the output of the transmit unit Tx1 of the first transmission unit TR1 and the signal characteristic at the input of the receive unit Rx1 of the first transmission unit TR1 in the upper part of the graph and with the signal characteristic at the input of the receive unit Rx2 of the second transmission unit TR2 and the signal characteristic at the output of the transmit unit Tx2 of the second transmission unit TR2 in the lower part of the frequency-time graph.

After the two transmission units TR1, TR2 are switched on at instant to, the two transmit units Tx1, Tx2 of the two transmission units TR1, TR2 begin emitting, again independently of each other, the first synchronization signal P11, P21 respectively at the instants $t_1$, $t_2$ via the respective transmission channel DC12, DC21. The first synchronization signal P21 of the transmit unit Tx2 of the second transmission unit TR2 is detected very quickly by the receive unit Rx1 of the first transmission unit TR1, for example, after one-time emission. Successful detection and synchronization with the first synchronization signal P21 of the transmit unit Tx2 of the second transmission unit TR2 is again signaled to the associated control unit C1 by the receive unit Rx1 of the first transmission unit TR1. The transmit unit Tx1 of the first transmission unit TR1, which has likewise been emitting its first synchronization signal P11 since instant $t_2$, is consequently instructed to begin emitting its second synchronization signal P12.

Since after the at least one-time emission of the first synchronization signal P11 by the transmit unit Tx1 of the first transmission unit TR1 there was still no information about a synchronization status of the receive unit Rx2 of the second transmission unit TR2, however, the transmit unit Tx2 of the second transmission unit TR2 continues to emit the respective first synchronization signal (periodically repeated)—since, for example, the receive unit Rx2 of the second transmission unit TR2 could not detect the first synchronization signal P11 of the transmitter Tx1 of the first transmission unit TR1 owing to a brief reception disturbance.

Since synchronization has already been signaled by the associated receive unit Rx1, the transmit unit Tx1 of the first transmission unit TR1 has in the meantime changed over to emitting the second synchronization signal P12. The second synchronization signal P12 of the transmit unit Tx1 of the first transmission unit TR1 is now used in the receive unit Rx2 of the second transmission unit TR2 for detection and synchronization. Therefore, for example, the second synchronization signal P12, emitted one time, of the transmit unit Tx1 of the first transmission unit TR1 is detected by the receive unit Rx2 of the second transmission unit TR2. The receive unit Rx2 of the second transmission unit TR2 signals successful detection and synchronization to the associated control unit C2. The transmit unit Tx2 of the second transmission unit TR2 is consequently instructed by the associated control unit C2 to emit the respective second synchronization signal P22.

The first synchronization signal repeatedly emitted by the transmit unit Tx2 of the second transmission unit TR2 is received by the receive unit Rx1 of the first transmission unit TR1 but is interpreted by the associated control unit C1 only as information about synchronization that has not yet taken place in the receive unit Rx2 of the second transmission unit TR2. The transmit unit Tx1 of the first transmission unit TR1 is therefore instructed by the associated control unit C1 to continue to emit its second synchronization signal P12.

Only after successful reception of the second synchronization signal P22, emitted by the transmitter Tx2 of the second transmission unit TR2, by the receive unit Rx1 of the first transmission unit TR1 is the transmit unit Tx1 of the first transmission unit TR1 instructed by the associated control unit C1 to begin transmission of the useful data ND1, in particular with a starting sequence of the useful data transmission.

Analogously, after successful detection for the first time of the second synchronization signal P12 of the transmit unit Tx1 of the first transmission unit TR1 by the receive unit Rx2 of the second transmission unit TR2 and subsequent synchronization of the receive unit Rx2 of the second transmission unit TR2, the transmit unit Tx2 of the second transmission unit TR2 is also instructed by the associated control unit C2 to begin transmission of the useful data ND2, in particular transmission of a starting sequence for the useful data transmission.

This means, regular data transmission is only started by the respective transmission unit TR1, TR2 if the second synchronization signal P12, P22 respectively from each of the two transmission units TR1, TR2 has been received or detected at least once by the respective receive unit Rx1, Rx2 and, consequently, has been emitted at least once by the respective transmit unit Tx1, Tx2. Otherwise, the synchronization phase is maintained by the two transmission units TR1, TR2.

In case of a potential reception or communication disturbance in one of the transmission channels DC12, DC21, the synchronization phase is started anew with the course of the inventive method illustrated by way of example in FIG. 4, likewise as illustrated and described in FIG. 2.

Figure 5:
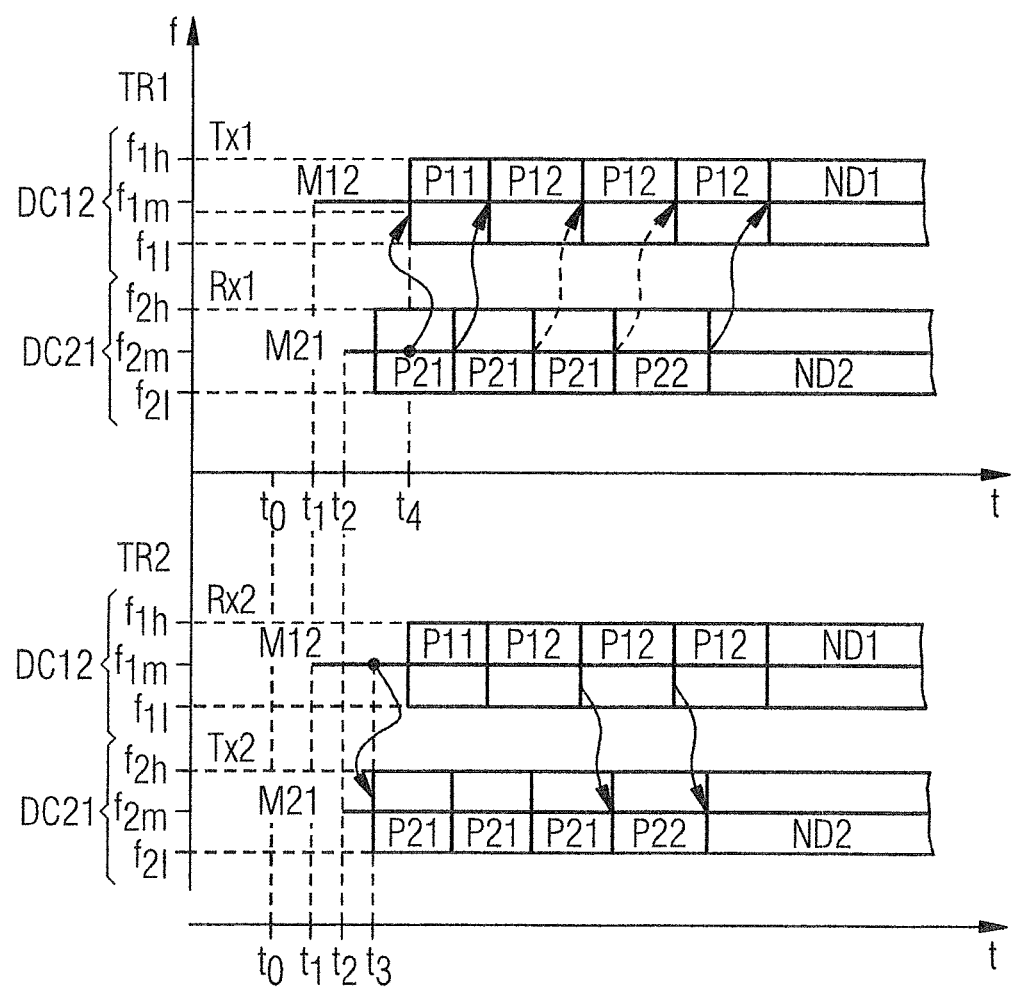
FIG. 5 shows an exemplary graphical plot of a time characteristic of the inventive method for establishing a duplex connection using two further transmission channels for a signal transmission in accordance with the invention.

FIG. 5 in turn shows the exemplary graphical plot of the inventive method already described with reference to FIG. 4, although two further, unidirectional transmission channels M12, M21 are used for additional signaling, for example, of status information about the respective transmission unit TR1, TR2, and these can be provided in addition to the two opposingly directed, unidirectional transmission channels DC12, DC21. As shown by way of example in FIG. 5, the two additional transmission channels M12, M21 are distinguished by the two opposingly directed, unidirectional transmission channels DC12, DC21 in the frequency range. For example, a frequency range between the respective upper limit frequency fin, fen and the respective lower limit frequency $f_{1l}$, $f_{2l}$ is occupied by the two opposingly directed, unidirectional transmission channels DC12, DC21. For example, a frequency range around the respective medium frequency $f_{m1}$, $f_{m2}$ of the respective opposingly directed, unidirectional transmission channel DC12, DC21 is occupied by the two additional, unidirectional transmission channels M12, M21.

FIG. 5 again shows, as already shown in FIGS. 2, 3 and 4, an exemplary graphical plot of the method in the form of a frequency-time graph. The signal characteristic at the output of the transmit unit Tx1 of the first transmission unit TR1 and the signal characteristic at the input of the receive unit Rx1 of the first transmission unit TR1 are shown in the upper part and the signal characteristic at the input of the receive unit Rx2 of the second transmission unit TR2 and the signal characteristic at the output of the transmit unit Tx2 of the second transmission unit TR2 are shown in the lower part. A first additional unidirectional transmission channel M12 is also shown in the case of the signal characteristic at the output of the transmit unit Tx1 of the first transmission unit TR1 and at the input of the receive unit Rx2 of the second transmission unit TR2. A second additional, unidirectional transmission channel M21 is shown in the case of the signal characteristic at the input of the receive unit Rx1 of the first transmission unit TR1 and in the case of the signal characteristic at the output of the transmit unit Tx2 of the second transmission unit TR2.

After the two transmission units TR1, TR2 are switched on at instant to, the respective transmit units Tx1, Tx2 of the two transmission units TR1, TR2 begin emitting signals, for example status, signals relating to the respective state/status of the respective transmission unit TR1, TR2, via the two additional, unidirectional transmission channels M12, M21. The transmit unit Tx1 of the first transmission unit TR1 begins, for example, at instant $t_1$, with transmission of a status signal about the current status of the first transmission unit TR1 (such as switched on, or ready to transmit or receive) via the first additional, unidirectional transmission channel M12. At instant $t_2$, the transmit unit Tx2 of the second transmission unit TR2 starts emitting a status signal about the current status of the second transmission unit TR2 (such as switched on, or ready to transmit or receive) via the second additional, unidirectional transmission channel M21.

The respective status signal emitted via the additional, unidirectional transmission channels M12, M21 can be detected by the respective receive units Rx1, Rx2 of the two transmission units TR1, TR2. Therefore, for example, the status signal emitted via the first additional, unidirectional transmission channel M12 by transmitter Tx1 of the first transmission unit TR1 can be detected at an instant $t_3$ by the receiver Rx2. The other status signal, which is emitted via the second additional, unidirectional transmission channel M21 by the transmitter Tx2 of the second transmission unit TR2, is detected at an instant $t_4$ in the receiver Rx1 of the first transmission unit.

After detection of the respective status signal in the respective receive unit Rx1, Rx2, the respective transmit units Tx1, Tx2 are instructed by the associated control units C1, C2 respectively to begin emitting the first synchronization signal P11, P21 respectively with the corresponding repetition period $T_{11}$, $T_{21}$ respectively. The first synchronization signal P11, P21 respectively is thereby emitted only after emission of the respective status signals in the additional unidirectional transmission channels M12 and M21.

This means (as shown by way of example in FIG. 5) that a transmit unit Tx1 of the first transmission unit TR1 begins emitting the first synchronization signal P11 at the instant $t_4$ once the status signal of the second transmission unit TR2 has been detected in the receive unit Rx1 of the first transmission unit TR1, the status signal has been emitted in the additional unidirectional transmission channel M12 and a corresponding instruction given by the associated control unit C1. Analogously, the transmit unit Tx2 of the second transmission unit TR2 begins emitting the first synchronization signal P21 at the instant $t_3$ once the status signal of the first transmission unit TR1 has been received in the receive unit of the second transmission unit TR2, the status signal has been emitted in the additional unidirectional transmission channel M21 and the corresponding instruction given by the associated control unit C2. An incorrect interpretation of, for example, noise or interference signals on the respective transmission channel DC12, DC21 as the first synchronization signal P11, P21 respectively is significantly reduced thereby.

Furthermore, with the graphical plots of the inventive method shown by way of example in FIGS. 2 and 3, use or utilization of the additional, unidirectional transmission channels M12, M21 for emitting signals, such as status signals, is also possible. The additional two unidirectional transmission channels M12, M21 can also be used for example for additional signaling and data transfer tasks.

Figure 6:
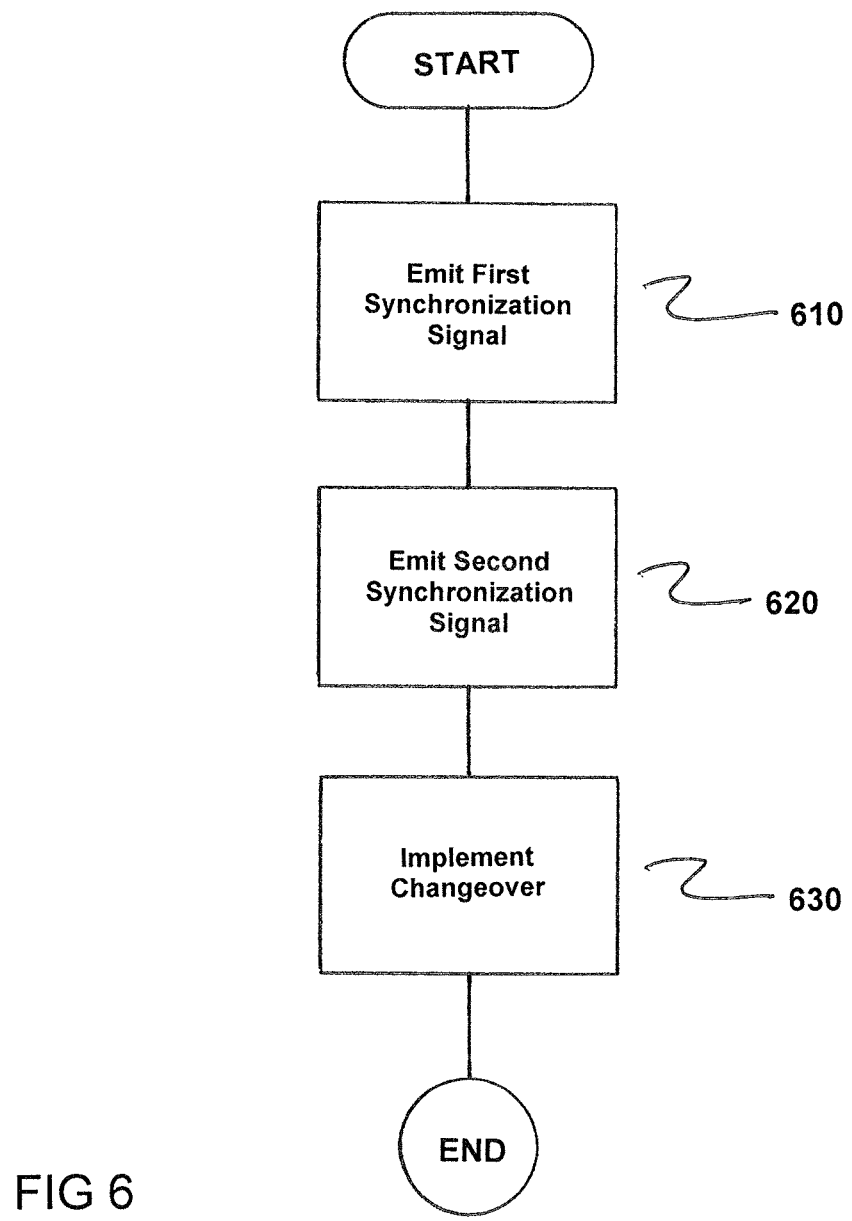
FIG. 6 is a flowchart of the method in accordance with the invention.

FIG. 6 is a flowchart of the method for establishing a duplex connection DC for data transmission between a plurality of transmission units TR1, TR2, each having a transmit unit Tx1, Tx2 and a receive unit Rx1, Rx2, where the duplex connection DC include a plurality of oppositely directed, unidirectional transmission channels DC12, DC21, via which a respective communications link for data transmission between a respective transmit unit Tx1, Tx2 and a respective receive unit Rx1, Rx2 of the plurality of transmission units TR1, TR2 is established.

The method comprises emitting, by the transmit units Tx1, Tx2 of the plurality of transmission units TR1, TR2, independently and in a periodically repeated manner, a first synchronization signal P11, P21 respectively during a synchronization phase independently emit, as indicated in step 610.

Next, a transmit unit Tx1, Tx2 belonging to the same transmission unit TR1, TR2 respectively is instructed to emit at least one time a second synchronization signal P12, P22 respectively following detection and synchronization with the respective first synchronization signal P11, P21 by the respective receive unit Rx1, Rx2, as indicated in step 620.

Next, a changeover to data transmission is implemented following at least one-time detection of the second synchronization signal P12, P22 respectively by the receive units Rx1, Rx2 of the plurality of transmission units TR1, TR2, as indicated in step 630.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for establishing a duplex connection for data transmission between a plurality of transmission units each having a transmitter and a receiver, the duplex connection including a plurality of oppositely directed, unidirectional transmission channels, via which a respective communications link for data transmission between a respective transmitter and a respective receiver of the plurality of transmission units is established, the method comprising:

emitting, by the transmitters of the plurality of transmission units, independently and in a periodically repeated manner, a first synchronization signal respectively during a synchronization phase;

instructing a transmitter belonging to the same transmission unit as the receiver respectively to emit at least one time a second synchronization signal respectively following detection and synchronization with the respective first synchronization signal by the respective receiver;

deriving the second synchronization signal respectively from the first synchronization signal of the respective transmitter of the respective transmission unit by changing at least one of an amplitude of the first synchronization signal and a polarity of the first synchronization signal; and implementing a changeover to data transmission following at least one-time detection of the second synchronization signal respectively by the receivers of the plurality of transmission units.

2. The method as claimed in claim 1, wherein each of the plurality of transmission units includes a controller via which the data transmission is monitored and the synchronization phase initiated.

3. The method as claimed in claim 2, wherein detection and synchronization is signalled with the first synchronization signal respectively by the respective receiver to the controller belonging to the same transmission unit; and wherein the transmitter belonging to the same transmission unit is instructed by the controller belonging to the same transmission unit to emit the second synchronization signal respectively.

4. The method as claimed in claim 1, wherein the synchronization phase is initiated at least one of (i) after starting the plurality of transmission units and (ii) due to a reception disturbance during data transmission.

5. The method as claimed in claim 3, wherein the reception disturbance is determined in the respective transmission unit via a metric for received signal quality.

6. The method as claimed in claim 5, wherein the metric for received signal quality comprises one of (i) cyclical redundancy checking, (ii) utilizing at least of an increased bit error rate and block error rate (iii) utilizing at least one of an increased bit error rate and block error ratio.

7. The method as claimed in claim 1, wherein in addition to the plurality of oppositely directed, unidirectional transmission channels, two further unidirectional transmission channels are provided between the two transmission units.

8. The method as claimed in claim 7, wherein at least one status signal of the respective transmission unit is transmitted via the two further transmission channels; and wherein the transmitters of the plurality of transmission units are instructed to periodically repeatedly emit the first synchronization signal respectively following detection of the respective status signal of each of the other transmission units.

9. The method as claimed claim 1, wherein the duplex connection is implemented as a full-duplex connection.

* * * * *